(12) United States Patent
Zha et al.

(10) Patent No.: US 10,845,641 B2
(45) Date of Patent: Nov. 24, 2020

(54) DIRECT BACKLIGHT MODULE AND LIQUID CRYSTAL DISPLAY DEVICE

(71) Applicant: Wuhan China Star Optoelectronics Technology Co., Ltd., Hubei (CN)

(72) Inventors: Guowei Zha, Hubei (CN); Hongqing Cui, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 368 days.

(21) Appl. No.: 15/776,376

(22) PCT Filed: Mar. 12, 2018

(86) PCT No.: PCT/CN2018/078659
§ 371 (c)(1),
(2) Date: May 15, 2018

(87) PCT Pub. No.: WO2019/148591
PCT Pub. Date: Aug. 8, 2019

(65) Prior Publication Data
US 2020/0271994 A1    Aug. 27, 2020

(30) Foreign Application Priority Data
Jan. 31, 2018 (CN) .......................... 2018 1 0093647

(51) Int. Cl.
*G02F 1/13357* (2006.01)
*G02F 1/1335* (2006.01)
(52) U.S. Cl.
CPC .. *G02F 1/133603* (2013.01); *G02F 1/133514* (2013.01); *G02F 1/133528* (2013.01);
(Continued)

(58) Field of Classification Search
None
See application file for complete search history.

(56) References Cited

U.S. PATENT DOCUMENTS

2012/0113672 A1* 5/2012 Dubrow ............... G02B 6/0068
362/602
2013/0341588 A1* 12/2013 Jeon ........................ G02F 1/174
257/13
(Continued)

FOREIGN PATENT DOCUMENTS

| CN | 106959520 | 7/2017 |
| CN | 206757263 | 12/2017 |

(Continued)

*Primary Examiner* — Elmito Breval
(74) *Attorney, Agent, or Firm* — Leong C. Lei

(57) ABSTRACT

A direct backlight module is disclosed, and includes: a substrate having a driving circuit layer; multiple blue LED chips disposed on the substrate, and the multiple blue LED chips are electrically connected to the driving circuit layer; an optical conversion layer covered on the multiple blue LED chips, wherein the optical conversion layer includes a colloidal material, multiple phosphor particles and multiple haze particles disposed in the colloidal material, the optical conversion layer converts a blue light emitted from the multiple blue LED chips into a white light; and a transparent dielectric layer and a metal grating layer sequentially formed on the optical conversion layer. A liquid crystal display device is also disclosed. The direct backlight module can reduce the thickness of the liquid crystal device, which is beneficial to realize a thin and narrow-frame liquid crystal display device.

20 Claims, 2 Drawing Sheets

(52) U.S. Cl.
CPC .. *G02F 1/133605* (2013.01); *G02F 1/133611* (2013.01); *G02F 2001/133612* (2013.01); *G02F 2001/133614* (2013.01)

(56) References Cited

U.S. PATENT DOCUMENTS

2014/0285997 A1\*　9/2014　Nitta .......................... F21V 9/08
　　　　　　　　　　　　　　　　　　　362/84
2016/0070136 A1\*　3/2016　Jang ...................... G02F 1/1336
　　　　　　　　　　　　　　　　　　　349/61

FOREIGN PATENT DOCUMENTS

| CN | 107608134 | 1/2018 |
|---|---|---|
| WO | 2014176818 | 11/2014 |

\* cited by examiner

DIRECT BACKLIGHT MODULE AND LIQUID CRYSTAL DISPLAY DEVICE

RELATED APPLICATIONS

The present application is a National Phase of International Application Number PCT/CN2018/078659, filed Mar. 12, 2018, and claims the priority of China Application No. 201810093647.1, filed Jan. 31, 2018.

FIELD OF THE INVENTION

The present invention relates to a liquid crystal display technology field, and more particularly to a direct backlight module, and a liquid crystal display device including the direct backlight module.

BACKGROUND OF THE INVENTION

A Liquid Crystal Display (LCD) is a flat and ultra-thin display device, which is formed by a certain number of color or black and white pixels, and being placed in front if a light source or a reflection surface. The liquid crystal display device has a low power consumption, and has features of high display quality, small size and light weight so that the LCD is favored by everyone and became a mainstream of the display device. Most of the liquid crystal display device in the market is a backlight type liquid crystal display device including a liquid crystal panel and a backlight module. The liquid crystal panel and a backlight module are disposed oppositely. The backlight module provides a display light source to the liquid crystal panel such that the liquid crystal panel can display an image.

Along with the development of the display technology, a demand for the user tends to an ultra-thin and narrow frame design. The structure of the backlight module is a key factor that affects the liquid crystal display device to realize the ultra-thin and narrow frame design. In the conventional art, the backlight module of the liquid crystal display device mainly includes a direct backlight module and a side-edge backlight module. The side-edge backlight module place a light bar at an edge of the module, and relies on a light guide plate to evenly distribute the light to a display region of the module so that the structure of the side-edge backlight module is thinner, but hard to reach a narrow-frame design. The direct backlight module has multiple light sources evenly distributed at a bottom of the backlight module, and adding diverging lens on the light source in order to perform a light mixing in the space inside the backlight module so that a larger mixing height is required. Accordingly, the direct backlight module can satisfy a narrow-frame design, but hard to realize a thin design.

SUMMARY OF THE INVENTION

According to the insufficient portions of the conventional art, the present invention provides a direct backlight module, which can realize an even light mixing effect in a smaller thickness in order to realize a thin and narrow-frame liquid crystal display device.

In order to achieve the above purpose, the present invention adopts following technology solution:

A direct backlight module, comprising:
a substrate having a driving circuit layer;
multiple blue LED chips disposed on the substrate, and the multiple blue LED chips are electrically connected to the driving circuit layer;
an optical conversion layer covered on the multiple blue LED chips, wherein the optical conversion layer includes a colloidal material, multiple phosphor particles and multiple haze particles disposed in the colloidal material, the optical conversion layer converts a blue light emitted from the multiple blue LED chips into a white light; and
a transparent dielectric layer and a metal grating layer sequentially formed on the optical conversion layer.

Wherein the substrate having the driving circuit layer forms a printed circuit board structure or a flexible printed circuit board structure.

Wherein each of the multiple blue LED chip is a flip-chip LED chip, the multiple blue LED chips are arranged on the substrate as a matrix.

Wherein a width of each blue LED chip is in a range of 100~600 μm, a space between adjacent two of the multiple blue LED chips is in a range of 100~1000 μm.

Wherein the colloidal material is silicone or resin.

Wherein the phosphor particles are yellow phosphor particles, the phosphor particles include red phosphor particles and green phosphor particles, or the phosphor particles include quantum dots that can be excited to emit a red light and green light.

Wherein a diameter of the haze particle is in a range of 1~10 μm.

Wherein a material of the transparent dielectric layer is selected from anyone or two of $SiO_2$, SiO, MgO, $Si_3N_4$, $TiO_2$ and $Ta_2O_5$, and a material of the metal grating layer is Al, Ag or Au.

Wherein a grating period of the metal grating layer is disposed as 20~500 nm, and a duty cycle of the metal grating layer is disposed as 0.1.0.9.

Wherein the direct backlight module further includes a reflective sheet, the reflective sheet is disposed at a side of the substrate away from the multiple blue LED chip.

The present invention also provides with a liquid crystal display device, wherein the liquid crystal display device includes a liquid crystal panel and a direct backlight module described above, the liquid crystal panel includes an array substrate, a liquid crystal layer, a color filter substrate and an upper polarizer; wherein the metal grating layer of direct backlight module also functions as a lower polarizer of the liquid crystal panel.

As the direct backlight module provided by the embodiment, a narrow-frame design advantage is maintained. Then, through disposing the haze particles and the metal grating layer, the haze particles provides with a diffusion function in order to increase the light-emitting angle such that a light distribution can be more even; the metal grating layer forms a reflective polarizer such that a portion of the light is reflected toward the blue LED chip. The light being reflected by the metal granting layer is repeatedly reflected between the phosphor particles and the haze particles to perform a light mixing. Therefore, the haze particles and the metal grating layer can make the direct backlight to realize an even light mixing effect in a smaller thickness in order to reduce the thickness of the direct backlight module.

Based on a combination of the above aspects, the direct backlight module provided by the embodiment of the present invention is applied in the liquid crystal device, which is very helpful for realizing a thin and narrow-frame liquid crystal display device. Furthermore, in the liquid crystal display device, because the metal grating layer in the direct backlight module forms a reflective polarizer, the metal grating layer also function as a lower polarizer of the liquid crystal display device, the present invention not only can reduce a total thickness of the liquid crystal device, but also reduce a problem of attenuation of reflection affect caused by multiple films separately disposed between the lower polarizer and the backlight module.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention. The present invention is not limited to the above embodiments.

Here, it should be noted that in order to avoid obscuring the present disclosure because of unnecessary detail, the figures only show structure and/or processing steps that are closely related according to the present solution, and the other details that are not related to the present disclosure is omitted.

Figure 1:
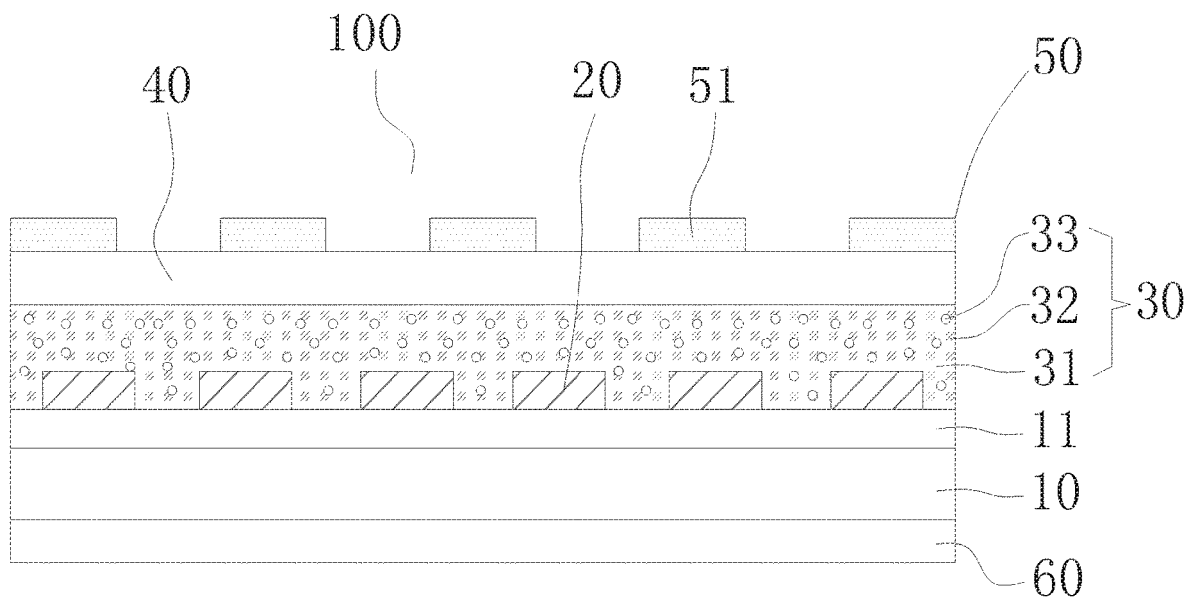
FIG. 1 is a schematic diagram of a direct backlight module according to an embodiment of the present invention.

The embodiment of the present invention provides with a direct backlight module. With reference to FIG. 1, the direct backlight module 100 includes a substrate 10, a blue LED chip 20, an optical conversion layer 30, a transparent dielectric layer 40 and a metal grating layer 50.

Wherein, the substrate 10 is provided with a driving circuit layer 11, the driving circuit layer 11 is configured to provide with a driving voltage and a driving current for the blue LED chip 20 in order to drive the blue LED chip 20 to emit a light. Specifically, the driving circuit layer 11 is provided with a solder pad (PAD), and the blue LED chip 20 is electrically connected with the solder pad. More specifically, the substrate 10 having the driving circuit layer 11 can form a printed circuit board (PCB) structure or a flexible printed circuit board (FPC) structure.

Figure 2:
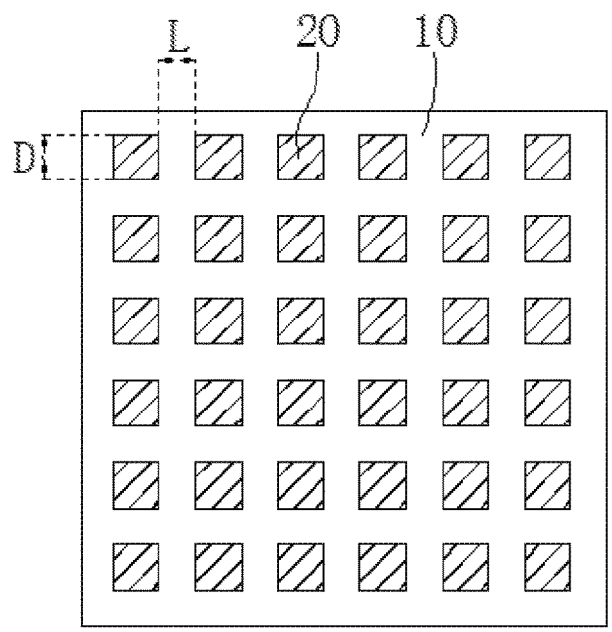
FIG. 2 is a schematic diagram of a top view of blue LED chips arranged as a matrix according to an embodiment of the present invention.

Wherein, the blue LED chip 20 is disposed on the substrate 10, the blue LED chip 20 is electrically connected to the driving circuit layer 11 through the solder pad. The blue LED chip 20 emits a blue light when receiving the driving signal. Specifically, in the present embodiment, as shown in FIG. 2, multiple blue LED chips 20 are arranged on the substrate 10 as a matrix.

Wherein, the optical conversion layer 30 is covered on the blue LED chip 20. The optical conversion layer 30 is used for converting the blue light emitted from the blue LED chip 20 into a white light. Specifically, as shown in FIG. 1, the optical conversion layer 30 includes a colloidal material 31 and multiple phosphor particles 32 and multiple haze particles 33 disposed in the colloidal material 31. The phosphor particles 32 can be excited by the blue light emitted from the blue LED chip 20 to emit a red light and a green light. Accordingly, the blue light emitted from the blue LED chip 20 and the red and the green lights which are emitted by the phosphor particles 32 can be mixed to form a white light. The haze particles 33 can diffuse the lights (including the blue light emitted from the blue LED chip 20 and the red light and the green light which are emitted from the phosphor particles 32) in order to increase a light-emitting angle such that the lights emitted from the optical conversion layer 30 to be distributed more evenly.

Furthermore, the colloidal material 31 can be silicone or resin. The phosphor particles 32 are yellow phosphor particles. Or, the phosphor particles 32 include red phosphor particles and green phosphor particles. Or, the phosphor particles 32 include quantum dots that can be excited to emit red lights and green light. A diameter of the haze particle 33 is in a range of 1~10 μm.

Wherein, the transparent dielectric layer 40 and the metal grating layer 50 are sequentially formed on the optical conversion layer 30. The transparent dielectric layer 40 is mainly used for protecting the optical conversion layer 30. The metal granting layer 50 forms a reflective polarizer. When a light emitted from the optical conversion layer 30 reach the metal granting layer 50, a polarization direction of the light that is perpendicular to the grating strips 51 of the metal granting layer 50 can be emitted out from the metal granting layer 50, and a polarization direction of the light that is parallel to the grating strips 51 of the metal granting layer 50 is reflected back to the blue LED chip 20. The light being reflected by the metal granting layer 50 is repeatedly reflected between the phosphor particles 32 and the haze particles 33 to perform a light mixing.

Specifically, the material of the transparent dielectric layer 40 can selected from anyone or above two of $SiO_2$, SiO, MgO, $Si_3N_4$, $TiO_2$ and $Ta_2O_5$. The material of $SiO_2$, SiO, and $Si_3N_4$ which are compatible with the manufacturing process of the liquid crystal display device are preferred. The material of the metal grating layer 50 can be selected from Al, Ag and Au. More specifically, a grating period of the metal grating layer 50 is disposed as 20~500 nm, and a duty cycle of the metal grating layer 50 is disposed as 0.1~0.9.

As the direct backlight module provided by the embodiment, through disposing the haze particles 33 and the metal grating layer 50, the haze particles 33 provides with a diffusion function and the metal grating layer 50 provides with a reflection function such that the direct backlight module can realize an even light mixing effect through a smaller thickness in order to reduce the thickness of the direct backlight module. Comparing to a conventional LED chip having a light-emitting angle of 120°, through the diffusion and the reflection function of the haze particles 33 and the metal grating layer 50, the light-emitting angle of single LED chip can be increased up to 150°~180°, which is beneficial to realize a light mixing distance of ultra-thin thickness under a same LED chip size and chip distance is order to reduce the thickness of the backlight module. Combining with the direct backlight module that can realize a narrow frame design, the direct backlight module applied in the liquid crystal device provided by the above embodiment is very helpful for realizing a thin and narrow-frame liquid crystal display device.

Furthermore, in the present embodiment, the direct backlight module 100 further includes a reflective sheet 60, the reflective sheet 60 can be disposed at a side of the substrate 10 away from the blue LED chip 20. The reflective sheet 60 can prevent a back side of the direct backlight module 100 from leaking light in order to increase a light utilization rate of the backlight module.

Furthermore, in the present embodiment, the blue LED chip 20 utilizes a same size flip-chip LED chip, the multiple blue LED chip 20 utilizes a dense, periodical and array-type arrangement. Through reducing the space between adjacent two of the blue LED chips 20, the mixing distance and the module thickness can be further reduced in order to meet the requirement for an ultra-thin backlight module (total thickness less than 1 mm). Specifically, as shown in FIG. 2, a width D of each blue LED chip 20 is in a range of 100~600 μm, a space L between adjacent two of the multiple blue LED chips 20 is in a range of 100~1000 μm.

Figure 3:
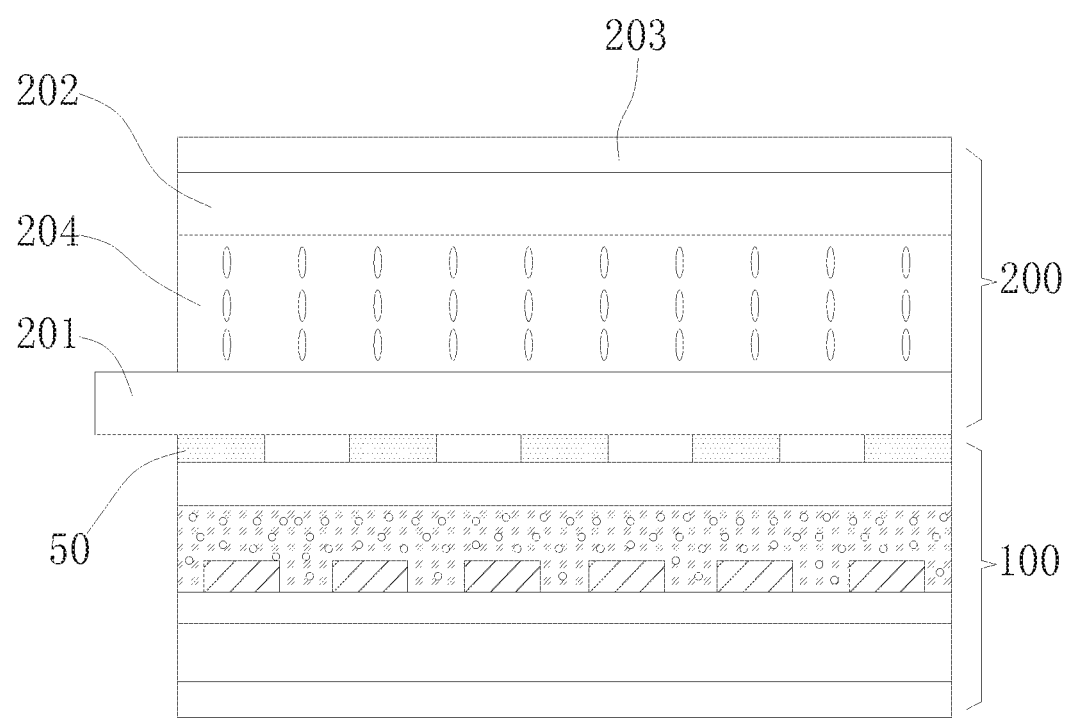
FIG. 3 is a schematic diagram of a liquid crystal display device according to an embodiment of the present invention.

The present embodiment also provides with a liquid crystal display device. As shown in FIG. 3, the liquid crystal display device includes a liquid crystal panel 200 and a backlight module 100. The backlight module 100 adopts a direct backlight module 100 provided in the embodiment of the present invention. The liquid crystal panel 200 and the direct backlight module 100 are disposed oppositely. The direct backlight module 100 provides a display light source to the liquid crystal panel 200 such that the liquid crystal panel can display an image. Wherein the liquid crystal panel 200 includes an array substrate 201, a color filter substrate 202 and an upper polarizer 203 sequentially disposed on the direct backlight module 100. A liquid crystal layer 204 is disposed between the array substrate 201 and color filter substrate 202. The metal grating layer 50 of direct backlight module 100 also functions as a lower polarizer of the liquid crystal panel.

As the liquid crystal display device provided above, because the direct backlight module 100 has a smaller light-mixing height, the liquid crystal display device can has a smaller thickness, which can realize a thin and narrow-frame liquid crystal display device. Furthermore, the metal grating layer of direct backlight module also functions as a lower polarizer of the liquid crystal panel, the present invention not only can reduce a total thickness of the liquid crystal device, but also reduce a problem of attenuation of reflection affect caused by multiple films separately disposed between the lower polarizer and the backlight module.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

The above embodiments of the present invention are only exemplary, however, the present invention is not limited. The person skilled in the art can understand: without exceeding the principle and spirit of the present invention, the above embodiments can be improved, wherein, the scope of the present invention is limited in the claims and the equivalents of the claims.

What is claimed is:

1. A direct backlight module, comprising:
   a substrate having a driving circuit layer;
   multiple blue LED chips disposed on the substrate, and the multiple blue LED chips are electrically connected to the driving circuit layer;
   an optical conversion layer covered on the multiple blue LED chips, wherein the optical conversion layer includes a colloidal material, multiple phosphor particles and multiple haze particles disposed in the colloidal material, the optical conversion layer converts a blue light emitted from the multiple blue LED chips into a white light; and
   a transparent dielectric layer and a metal grating layer sequentially formed on the optical conversion layer.

2. The direct backlight module according to claim 1, wherein the substrate having the driving circuit layer forms a printed circuit board structure or a flexible printed circuit board structure.

3. The direct backlight module according to claim 1, wherein each of the multiple blue LED chip is a flip-chip LED chip, the multiple blue LED chips are arranged on the substrate as a matrix.

4. The direct backlight module according to claim 3, wherein a width of each blue LED chip is in a range of 100~600 μm, a space between adjacent two of the multiple blue LED chips is in a range of 100~1000 μm.

5. The direct backlight module according to claim 1, wherein the colloidal material is silicone or resin.

6. The direct backlight module according to claim 5, wherein the phosphor particles are yellow phosphor particles, the phosphor particles include red phosphor particles and green phosphor particles, or the phosphor particles include quantum dots that can be excited to emit a red light and green light.

7. The direct backlight module according to claim 5, wherein a diameter of the haze particle is in a range of 1~10 μm.

8. The direct backlight module according to claim 1, wherein a material of the transparent dielectric layer is selected from anyone or two of $SiO_2$, SiO, MgO, $Si_3N_4$, $TiO_2$ and $Ta_2O_5$, and a material of the metal grating layer is Al, Ag or Au.

9. The direct backlight module according to claim 1, wherein a grating period of the metal grating layer is disposed as 20~500 nm, and a duty cycle of the metal grating layer is disposed as 0.1~0.9.

10. The direct backlight module according to claim 1, wherein the direct backlight module further includes a reflective sheet, the reflective sheet is disposed at a side of the substrate away from the multiple blue LED chip.

11. A liquid crystal display device, wherein the liquid crystal display device includes a liquid crystal panel and a direct backlight module, and the direct backlight module comprises:
    a substrate having a driving circuit layer;
    multiple blue LED chips disposed on the substrate, and the multiple blue LED chips are electrically connected to the driving circuit layer;
    an optical conversion layer covered on the multiple blue LED chips, wherein the optical conversion layer includes a colloidal material, multiple phosphor particles and multiple haze particles disposed in the colloidal material, the optical conversion layer converts a blue light emitted from the multiple blue LED chips into a white light; and
    a transparent dielectric layer and a metal grating layer sequentially formed on the optical conversion layer;
    the liquid crystal panel includes an array substrate, a liquid crystal layer, a color filter substrate and an upper polarizer;
    wherein the metal grating layer of direct backlight module also functions as a lower polarizer of the liquid crystal panel.

12. The liquid crystal display device according to claim 11, wherein the substrate having the driving circuit layer forms a printed circuit board structure or a flexible printed circuit board structure.

13. The liquid crystal display device according to claim 11, wherein each of the multiple blue LED chip is a flip-chip LED chip, the multiple blue LED chips are arranged on the substrate as a matrix.

14. The liquid crystal display device according to claim 13, wherein a width of each blue LED chip is in a range of 100~600 μm, a space between adjacent two of the multiple blue LED chips is in a range of 100~1000 μm.

15. The liquid crystal display device according to claim 11, wherein the colloidal material is silicone or resin.

16. The liquid crystal display device according to claim 15, wherein the phosphor particles are yellow phosphor particles, the phosphor particles include red phosphor particles and green phosphor particles, or the phosphor particles include quantum dots that can be excited to emit a red light and green light.

17. The liquid crystal display device according to claim 15, wherein a diameter of the haze particle is in a range of 1~10 μm.

18. The liquid crystal display device according to claim 11, wherein a material of the transparent dielectric layer is selected from anyone or two of $SiO_2$, SiO, MgO, $Si_3N_4$, $TiO_2$ and $Ta_2O_5$, and a material of the metal grating layer is Al, Ag or Au.

19. The liquid crystal display device according to claim 11, wherein a grating period of the metal grating layer is disposed as 20~500 nm, and a duty cycle of the metal grating layer is disposed as 0.1~0.9.

20. The liquid crystal display device according to claim 11, wherein the direct backlight module further includes a reflective sheet, the reflective sheet is disposed at a side of the substrate away from the multiple blue LED chip.

* * * * *